US012136053B2

(12) United States Patent
Popelka et al.

(10) Patent No.: US 12,136,053 B2
(45) Date of Patent: Nov. 5, 2024

(54) COMMUNICATING BASED ON A WORKFLOW USING WEB BEHAVIOR DATA

(71) Applicant: Salesforce, Inc., San Francisco, CA (US)

(72) Inventors: Aaron Popelka, San Francisco, CA (US); William Robert Jennings, II, Indianapolis, IN (US); Alicia Greer, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 337 days.

(21) Appl. No.: 17/387,025

(22) Filed: Jul. 28, 2021

(65) Prior Publication Data

US 2023/0031718 A1 Feb. 2, 2023

(51) Int. Cl.
*G06Q 10/0633* (2023.01)

(52) U.S. Cl.
CPC ................ *G06Q 10/0633* (2013.01)

(58) Field of Classification Search
None
See application file for complete search history.

(56) References Cited

U.S. PATENT DOCUMENTS

| | | | | |
|---|---|---|---|---|
| 6,873,968 B2* | 3/2005 | Ehrlich | ............... | G06Q 50/188 705/26.4 |
| 8,204,799 B1* | 6/2012 | Murray | ............. | G06Q 30/0635 705/26.81 |
| 9,075,687 B1* | 7/2015 | Liu | ......................... | H04L 67/10 |
| 9,509,571 B1* | 11/2016 | Liu | ..................... | H04L 41/5045 |
| 10,885,551 B2* | 1/2021 | Dimaunahan | ...... | G06Q 30/0253 |
| 2004/0249497 A1* | 12/2004 | Saigh | ..................... | E04H 14/00 700/216 |

(Continued)

FOREIGN PATENT DOCUMENTS

EP 3454281 A1 * 3/2019 ............. G06Q 30/02

OTHER PUBLICATIONS

Force.com Multitenant Architecture, Understanding the Design of Salesforce.com Internet Application, whitepaper developerforce. com, archives org, Feb. 25, 2021 http://web.archive.org/web/20210225055437/https://www.developerforce.com/media/ForcedotcomBookLibrary/Force.com_Multitenancy_WP_101508.pdf (Year: 2021).*

(Continued)

*Primary Examiner* — Octavian Rotaru

(74) *Attorney, Agent, or Firm* — Holland & Hart LLP

(57) ABSTRACT

A server may execute a communication process flow that controls electronic communications between a tenant of a multitenant system and a set of users corresponding to the tenant. A set of electronic communications that are transmitted to a particular user of the set of users is determined based at least in part on a set of actions defined by the communication process flow. The server may monitor web behavior data associated with the set of users in accordance with a first action of the set of actions, detect that a first user of the set of users satisfies a rule defined by the first action based at least in part on monitoring of the web behavior data, and route the first user to a next action of the set of actions in the communication process flow based at least in part on detecting that the first user satisfies the rule.

20 Claims, 11 Drawing Sheets

(56) References Cited

U.S. PATENT DOCUMENTS

| | | | | |
|---|---|---|---|---|
| 2008/0175222 A1* | 7/2008 | Barnea | ................... | H04L 61/30 |
| | | | | 370/351 |
| 2015/0026604 A1* | 1/2015 | Mulukuri | ............ | G06F 16/9535 |
| | | | | 715/758 |
| 2017/0236152 A1* | 8/2017 | Dimaunahan | ...... | G06Q 30/0253 |
| | | | | 705/14.51 |
| 2018/0007150 A1* | 1/2018 | Deopura | ................. | H04W 4/23 |
| 2019/0147497 A1* | 5/2019 | Ko | ..................... | G06Q 30/0246 |
| | | | | 705/14.45 |
| 2022/0293107 A1* | 9/2022 | Leaman | ................ | G06F 16/951 |
| 2022/0366459 A1* | 11/2022 | Vieyra | ............... | H04L 65/4038 |

OTHER PUBLICATIONS

Steve Hogan, What is the Customer Journey and Why do you need to create one, crazyegg webpages, Jun. 29, 2021 https://www.crazyegg.com/blog/customer-journey/ (Year: 2021).*

* cited by examiner

COMMUNICATING BASED ON A WORKFLOW USING WEB BEHAVIOR DATA

FIELD OF TECHNOLOGY

The present disclosure relates generally to database systems and data processing, and more specifically to communicating based on a workflow using web behavior data.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A CRM solution may support a communication service, in which communications are scheduled for various users or subscribers to an organizational platform. A user may be scheduled for communications based on various user data known about the user, such as demographic data. For example, a user over the age of forty may receive a first version of an image in an email, while a user that is forty or under may be receive a second version of an image in an email.

DETAILED DESCRIPTION

A communication service may support a communication workflow system, where a user, such as a marketing manager, may configure a communication workflow for a plurality of users that are associated with a tenant of a multi-tenant computing system. In some examples, the users are subscribers, customers, or prospective customers of the tenant. The communication workflow may manage delivery of a set of communications (e.g., emails, push notifications, text messages, or the like) to a set of the plurality of users. For example, the communication workflow may define which users of the plurality of users are to receive a content item (e.g., image) in email based on demographic data associated with users. The workflow may also define a communication timeline or schedule, conditional communications, etc. In some examples, an administrator may define the workflow using a user interface, where the administrator may configure various routes, conditionals, schedules, etc. A workflow routing may define the communication schedule and content. As described herein, a communication workflow may be referred to as a communication process flow, a communication journey, a set of actions, or the like.

Techniques described herein leverage using real-time or near real-time web behavior data (e.g., captured web browsing tracking services) in order to support workflow entry and routing for tenant subscribers. For example, web behavior data may define whether a particular user/subscriber is to enter a workflow as well as for defining various routes once a user enters the workflow. An administrator may use a workflow builder UI to define Boolean expressions as rules defining user entry to a workflow and routing within a workflow based on web behavior. Example web behavior may include browsing or purchasing products within a particular product category of a tenant, scrolling depth on a product page, and the like.

Aspects of the disclosure are initially described in the context of an environment supporting an on-demand database service. Aspects of the disclosure are further described with respect to a computing architecture illustrating web behavior use in communications, an example communication process flow, and a process flow diagram. Aspects of the disclosure are further illustrated by and described with reference to apparatus diagrams, system diagrams, and flowcharts that relate to communicating based on a workflow using web behavior data.

Figure 1:
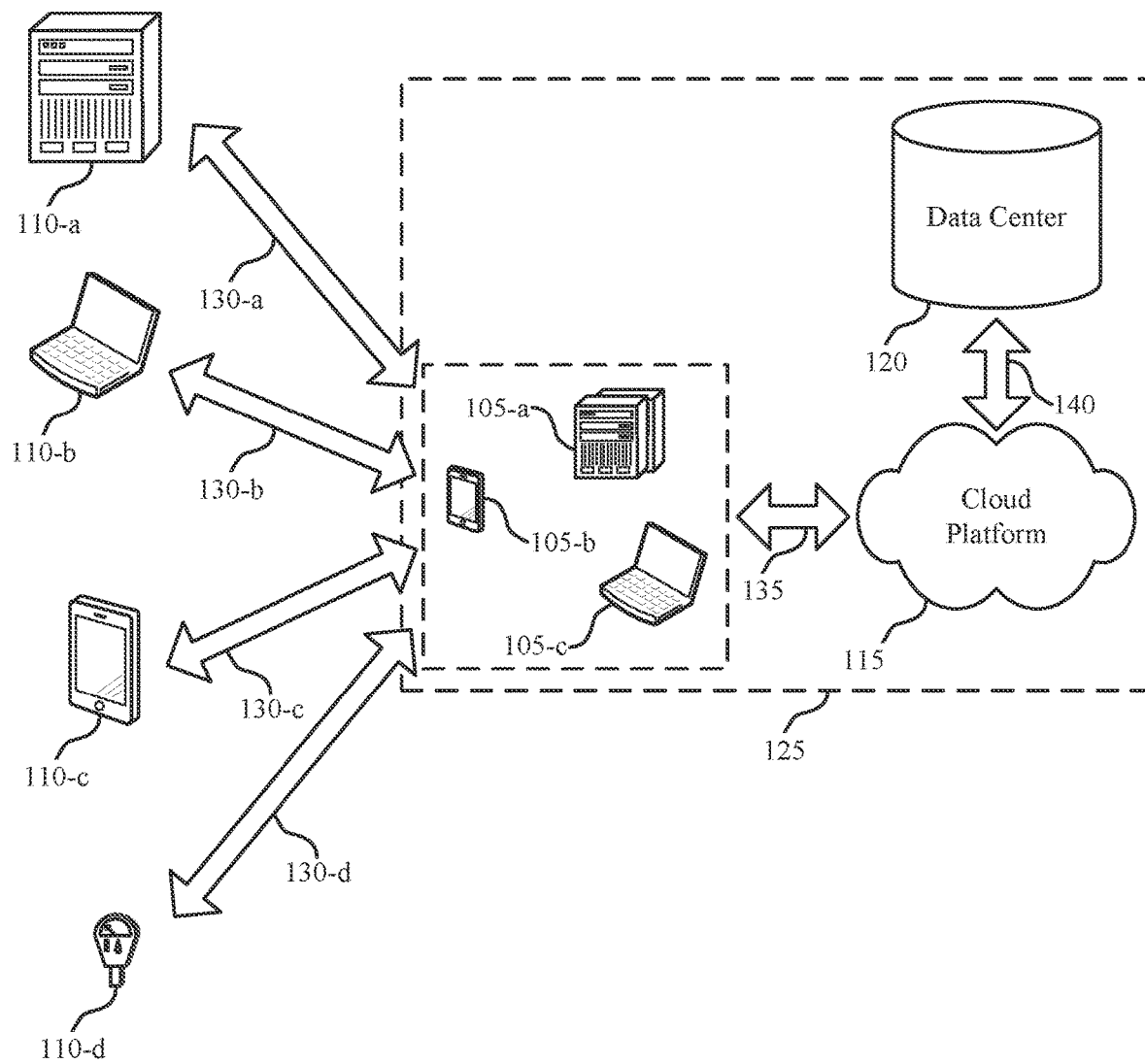
FIG. 1 illustrates an example of a data processing system that supports communicating based on a workflow using web behavior data in accordance with aspects of the present disclosure.

FIG. 1 illustrates an example of a system 100 for cloud computing that supports communicating based on a workflow using web behavior data in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

System 125 may support a communication workflow service, where a set of communications to be delivered by a communication platform to a set of users (e.g., contacts 100) associated with a tenant of a multitenant system may be configured via a communication workflow. The set of communications may be delivered to the ser of users based on attribute data associated with the users (e.g., where the attribute data is stored in data center 120).

Some communication platforms may utilize static data as well as user interaction with prior communications in order to define how the user is to receive various communications. For example, users may be split to different routes in the workflow based on whether the user engaged with a prior communication. Additionally, the user entry into the workflow may be based on a static (or periodically refreshed) comma-separated values (CSV) file. Periodic refreshing may utilize significant resources for large datasets of users. Additionally, communication workflows may be enhanced if dynamic data for users is leveraged for workflow entry and routing.

Techniques described herein leverage real-time or near real-time web behavior data associated with users in order to support workflow entry and routing for tenant users (e.g., subscribers, customers, prospective customers), such as contacts 110. For example, web behavior data (e.g., interactions 130) may be captured, monitored, and formatted for ingestion by the workflow system in order to route users into and within a predefined workflow. For example, an administrator may use a user interface to define Boolean expressions as rules defining user entry to a workflow and routing within a workflow based on web behavior. Example web behavior may include browsing or purchasing products within a particular product category of a tenant, scrolling depth on a product page, etc. Accordingly, these techniques may avoid the use of refreshing attribute files, thus limiting unnecessary processing and memory resource use, while also enhancing the communication workflow system.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
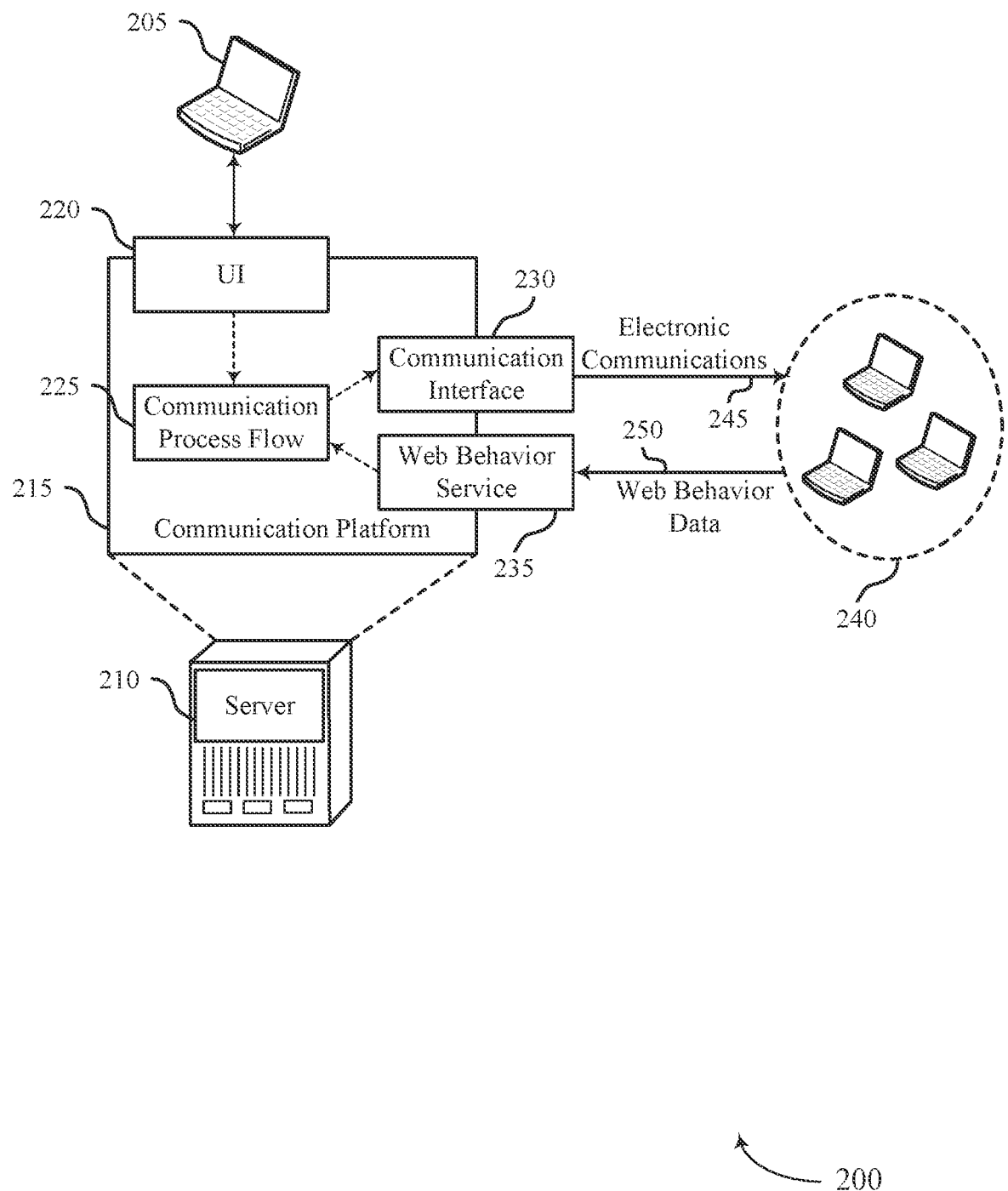
FIG. 2 illustrates an example of a computing architecture that supports communicating based on a workflow using web behavior data in accordance with aspects of the present disclosure.

FIG. 2 illustrates an example of a computing architecture 200 that supports communicating based on a workflow using web behavior data in accordance with aspects of the present disclosure. The computing architecture includes a server 210, a user device 205, and user devices 240. The server 210 may be an example of aspects of subsystem 125 of FIG. 1. For example, the server 210 may represent computing components, such as components supporting cloud platform 115, data center 120, etc. of FIG. 1. The server 210 may support various services for multiple tenants (e.g., cloud clients 105 of FIG. 1) of a multitenant system. For example, the server 210 may support a communication platform 215 which may be used to schedule, manage, transmit, and monitor digital communications, such as emails, push notifications, text messages, and the like.

The communication platform 215 may support a communication process flow service that is used to configure a communication process flow 225 for a set of users associated with a particular tenant. For example, an administrative user, such as a marketing manager, may access a user interface (UI) of the communication platform 215 in order to configure a customized workflow (e.g., communication process flow 225) for a plurality of users associated with the tenant, such as subscribers, customers, prospective customers, application users, etc., which may be examples of contacts 100 of FIG. 1. For example, the communication process flow 225 may define when communications are to be sent to a set of users, the content to be included in the communications, and other custom configurations. In some cases, the communication process flow 225 may define various possible paths in which a user is routed, depending on attribute data (e.g., demographic data, interests, past behavior, inferred data) associated with the user. For example, a first user having a first set of attributes may receive a first set of digital communications according to a first path within the communication process flow 225, while a second user having a second set of attributes may receive a second set of digital communications according to a second path. In some cases, conditionals may be included in the communication process flow 225, and whether the user is routed along a first or second path after the conditional action may be dependent on user interaction with a prior communication within the communication process flow 225. For example, if the user interacted with (e.g., opened, clicked) the prior communication, then the user is routed along the first path that the specifies that the user is to receive a first set of communications. If the user did not interact with or deleted the communication, then the user may be routed along the second path that specifies that the user is to receive a second set of communications.

The communication platform 215 may support a communication interface 230 that transmits electronic communications 245 to users, and the users may access the electronic communications 245 via user devices 240. As described herein, the electronic communications 245 may be in the form of emails, text messages, push notifications, web advertisements, and the like. As such, the communication interface 230 may represent an email server, a text message server, advertising server, etc. In some cases, the communication interface 230 may monitor user interaction with the transmitted electronic communications 245. Such interaction may include opens, clicks, deletes, ignores, unsubscribes, etc. The communication platform 215 may generate metrics based on interaction, update user data based on interaction, and the like.

As described, an administrative user may access the communication platform 215 at the UI 220 in order to configure the communication process flow 225. For example, the user interface 220 may support configuration of the communication process flow 225 via placement of user interface components onto a canvas, selection of parameters for the components, etc. The components may correspond to communication actions, such as send email, scheduling actions, such as wait for one week, conditional actions, such as different routes based on attribute data, and other types of actions. The configured communication process flow 225 may be one of a plurality of communication process flows that may be defined for various different subsets of the plurality of users associated with a particular tenant. For example, the communication process flows may correspond to marketing campaigns for the subset of users.

In some communication systems, data that is used to determine various communications may be static or periodically updated. For example, data ingested by the communication platform in order to schedule or manage communications, such as attribute data associated with various users, may be in the form of a delimited text file (e.g., a CSV file) or table, where each row corresponds to a user, and various columns may include attribute data for the users. These communications systems may read the attribute data from the delimited text file in order to determine which users are to receive various communications, as well as content of the communications. However, as various data regarding users may be constantly changing (e.g., user purchases product, views product, expresses interest), the data of the delimited text file or table may be periodically updated in a batch manner (e.g., once a week). This updating process may be memory and resource inefficient, as there may be millions of rows and columns of data to update. Further, the data from the delimited text files may be ingested into a communication workflow using a file transfer protocol (FTP) technique, which may be inefficient. Additionally, as the updating process is slow and periodic, some of the data may be outdated or stale as the data is ingested by the communication system. This may result in communications being sent with irrelevant content, thus wasting communication resources. For example, a user may express interest in a product, and thus may be scheduled to receive a communication advertising the product. However, after expressing interest, the user may purchase the product. Thereafter, the user may receive the communication advertising the product, which is a waste of resource due to the product already being purchased by the user.

Implementations described herein leverage web behavior data 250 in order to inform routing users into and through the communication process flow 225. A web behavior service 235 may ingest, monitor, and format web behavior data 250 associated with various users. For example, the users may access the platforms associated with tenants (e.g., websites, applications) via user devices 240, and the web behavior data 250 may be captured and ingested by the web behavior service 235. The data may be formatted for consumption for the communication platform 215 and/or the communication process flow 225 defined for the users. For example, a set of users may be defined for the communication process flow 225 based on various attributes. Further, a process flow entry condition may be defined for entry of a user into the communication process flow 225, and the process flow entry condition may be based on web behavior data 250. The process flow entry condition may be referred to as an "entry source web behavior rule."

Additionally or alternatively, the web behavior data may be used to inform how a user, that has "entered" the communication process flow 225, is to be routed through a process flow. In some cases, a decision split may be defined within the communication process flow 225, and the decision split may depend on the web behavior data 250. For example, the decisions split may specify that users that have visited a webpage of a particular product category may be routed into a first path defining a set of communications that are to be transmitted, while users that have purchased a product of the product category are to be routed into a second path defining a set of communications that are to be transmitted. As the user web behavior data 250 is monitored on a near real-time basis, once a user meets one of these conditions, the user is routed into the path associated with the condition.

The web behavior data described herein may be ingested by the web behavior service 235 using a software development kit (SDK) associated with tenant platforms (e.g., an SDK supported by the multitenant system). For example, the data may be ingested using an application programming interface (API). In some cases, the data is ingested in real-time or near real-time via the API per web behavior event (e.g., page navigation, scrolling, viewing, etc.). In some cases, the web behavior data may be structured in JavaScript object notation (JSON) format, allowing for structured data with arrays and hierarchy, which may further support efficient ingestion and analysis to permit the techniques described herein.

Thus, using web behavior data 250 in order to inform communication process flow 225 decisions may enrich user experience, while also avoiding utilization of stale data (which is resource intensive to update) to information communications, thus avoiding wasting communication resources. As described in further detail herein, the web behavior data 250 may also inform the content that a user receives within an electronic communication 245 that is transmitted according to the communication process flow 225. The content may be selected, based on web behavior data, at open time, thereby providing a near-real time content selection.

Figure 3:
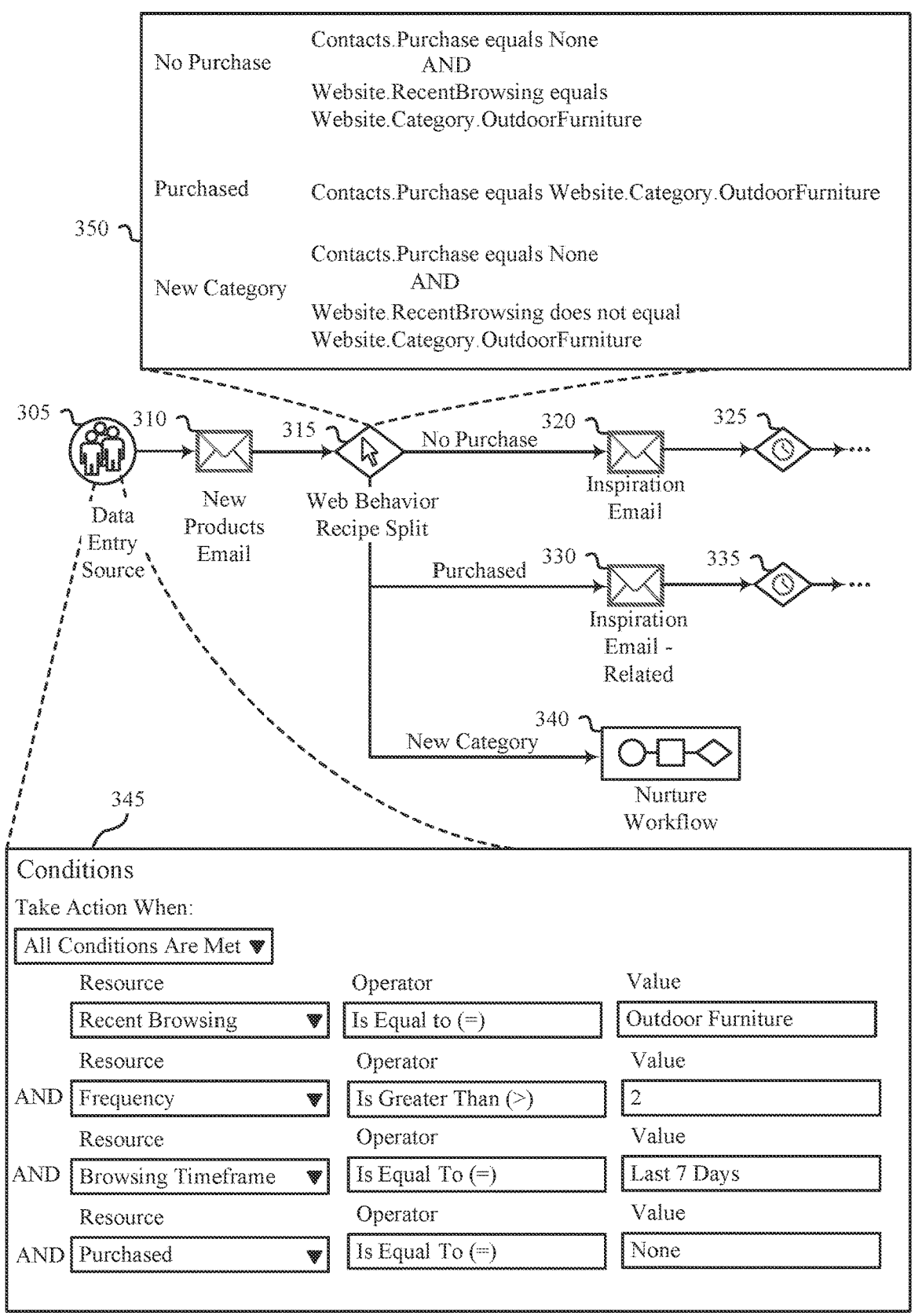
FIG. 3 illustrates an example of a representation of a process flow supports communicating based on a workflow using web behavior data in accordance with aspects of the present disclosure.

FIG. 3 illustrates an example of a representation of a process flow 300 that supports communicating based on a workflow using web behavior data in accordance with aspects of the present disclosure. The representation of the process flow 300 may be configured at a UI (e.g., UI 220 of FIG. 2) by an administrator of a tenant. The administrator may organize various actions (e.g., actions 305 through 340), define various parameters and customizations for each action, etc. The communication process flow 300 may be executed by a server, such as server 210 of FIG. 2, in order to manage communications between the tenants and various users, such as subscribers, customers, etc. Execution of the communication process flow 300 may correspond to execution of instructions corresponding to the actions of the process flow. The communication process flow 300 utilizes web behavior data in order to determine various actions that are to be performed in association with users associated with the tenant, as described herein.

Action 305 corresponds to an entry source into the communication process flow 300. In some cases, the action 305 may be an example of a conditional entry source into the process flow 300. A UI 345, which may be an example of aspects of UI 220 of FIG. 2, may be used to configure that conditions that are to be satisfied by a user such that the user "enters" the process flow (e.g., the instructions corresponding to the actions of the process flow are executed in relation to the user). As illustrated at UI 345, various parameters may be configured to create the rule corresponding to the action 305. The parameters may include a resource (e.g., a particular web browsing data parameter), such as recent browsing, frequency of browsing, browsing timeframe, purchase, etc. Each of these parameters may correspond to actions performable by a user at a platform associated with a tenant, such as a website or application. The resource may be combined with an operator (e.g., mathematical operator or symbol) and a value. The value may correspond to a particular category on the platform, product on the platform, webpage on the platform, or a numerical value, depending on the selected resource. Further, each of the expressions (e.g., resource, operator, and value) may be combined together using Boolean operators (e.g., AND, OR, XOR). The rule that is configured, when the process flow 300 is executed, may be converted into processor executable instructions, and the instructions may utilize the web behavior data to determine whether the set of conditions, expressions (e.g., the rule) is satisfied. If satisfied, the next action 310 of the process flow 300 may be executed for the user associated with data that satisfied the rule.

The action 310 may correspond to a communication transmission action (e.g., send email). Thus, a user that satisfied the rule associated with action 305 (e.g., based on web behavior data) may receive an email based on action 310. The email may be customizable using the user interface. After the email is transmitted, the instructions corresponding to action 315 may be executed for the users.

Action 315 may correspond to a decision split action, where users are routed (e.g., next actions are executed) into various paths of the communication process flow 300 based on the web behavior data. At UI 350, the rule for the web behavior split may be configured. Each path may be defined based on one or more expression. For example, the "No Purchase Path" is defined by expression that specifies that a user did not purchase a product (e.g., Contacts.Purchase equals None) but that the user did browse an Outdoor Furniture category on the tenant platform/website (e.g., Website.RecentBrowsing equals Website.Category.OutdoorFurniture). Additionally, the two aforementioned expressions are combined using an AND operator. Thus, a user that satisfies the two expressions may be routed into the No Purchase path, where the actions 320 and 325 may be executed for those users.

The "Purchased" path may be defined by an expression that specifies that a user purchased a product in the Outdoor Furniture category (e.g., Contacts.Purchase equals Website.Category.OutdoorFurniture), and a user that satisfies this expression (e.g., based on the web behavior data for the user) is routed in to the Purchased path, where actions 330 and 335 may be executed for that user. The "New Category" path may be defined by an expression that specifies that a user did not purchase a product and did not browse the Outdoor Furniture Category on the tenant platform, and a user that satisfies these expressions may be routed to the new category path, where action 340 may be executed for that user. Action 340 may correspond to a new communication process flow action, where the user is routed to a different communication process flow including a different set of actions.

As another example utilization of web behavior data in the communication process flow 300, content that is displayed to various users may be defined based on the web behavior data. For example, an electronic communication, such as an email, may include a field that is to display one of a plurality of content items (e.g., images) that are associated with the electronic communication. The electronic communication may be transmitted to a plurality of users (e.g., at action 320). When a user opens an email, the server (e.g., server 210 of FIG. 2) detects the open (e.g., based on a received open indication), selects one of the plurality of content items, and transmits an indication of the content item to the client/user device for display. This process may occur at open time and may occur without the user noticing. Using techniques described herein, the selection of the content item may be based on the web behavior data associated with the user. Thus, if after the email is sent, but before the email is opened, the user browses a product page, then an image of that product may be selected for display for the user. As another example, if the user purchases a product between receipt and opening of the email, then the selection of the image may be performed such that the purchased product is not displayed (e.g., a related product is displayed). Thus, these techniques support enriched user experience and may avoid wasteful communications. It should be understood that other types of content items may be selected at run time, such as subject, body, text, color scheme, buttons, etc.

Thus, using these techniques, a user may configure the communication process flow 300 that may define how users may receive various communications based on the web behavior data associated with the users. Thus, these techniques may support enhanced user experience and avoid or limit communications that are irrelevant and waste computing resources.

Figure 4:
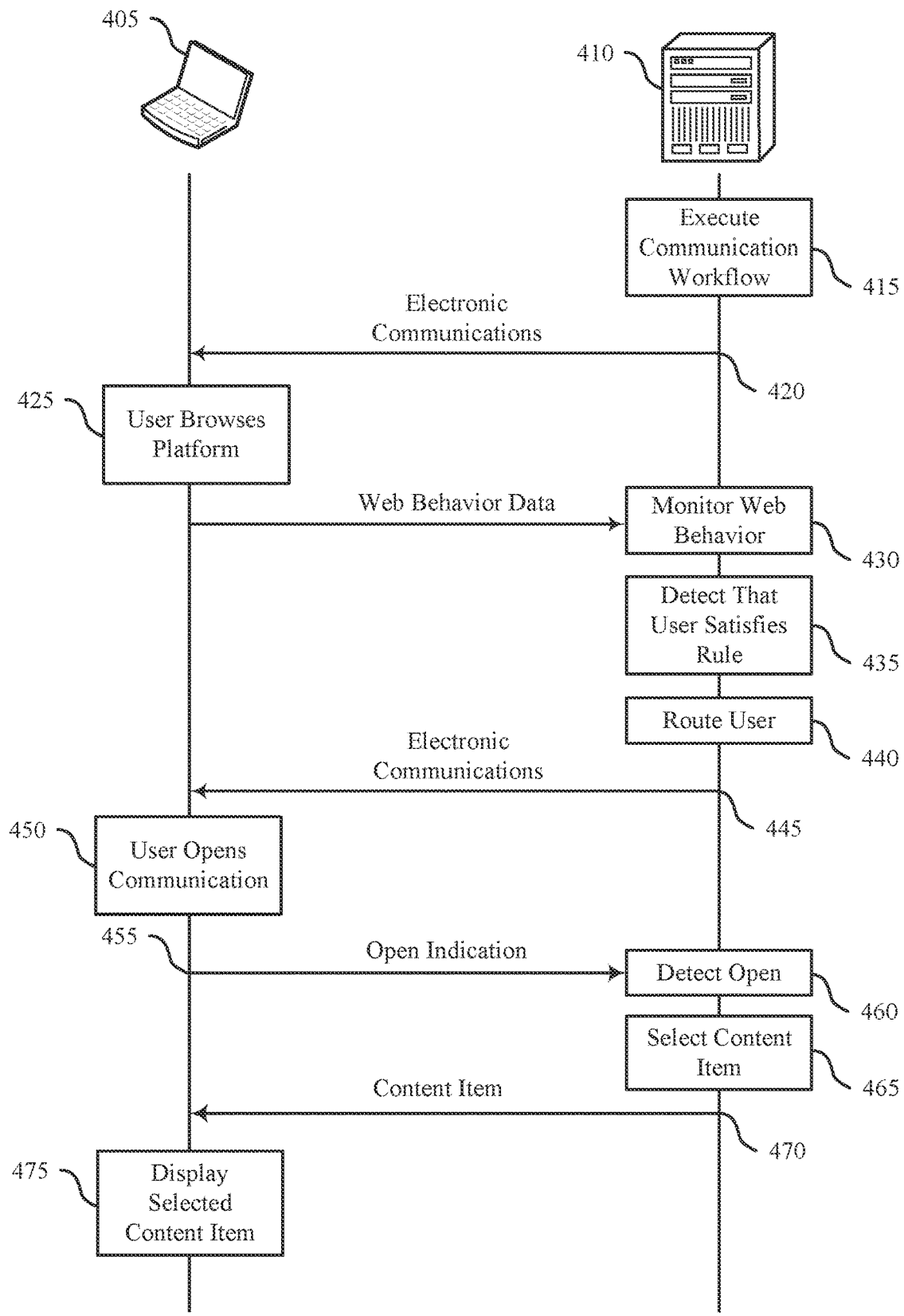
FIG. 4 illustrates an example of a process flow that supports communicating based on a workflow using web behavior data in accordance with aspects of the present disclosure.

FIG. 4 illustrates an example of a process flow 400 that supports communicating based on a workflow using web behavior data in accordance with aspects of the present disclosure. The process flow 400 includes a user device 405 and a server 410, which may be example of the corresponding devices as described with respect to FIGS. 1 and 2. In some examples, the server 410 may support a communication platform, a communication workflow service, a communications manager, etc., as described herein. The user device 405 may be an example of a device that is accessible by a user, subscriber, customer, etc. that is used to access received electronic communications, such as emails, push notifications, text messages, etc.

At 415, the server 410 may execute a communication process flow that controls electronic communications between a tenant of a multitenant system and a set of users corresponding to the tenant. A set of electronic communications that are transmitted to a particular user of the set of users is determined based at least in part on a set of actions defined by the communication process flow. The communication process flow may be configured by an administrator at a user interface, as described with respect to FIGS. 2 and 3. Execution of the process flow may include executing a set of instructions corresponding to the set of actions of the process flow, ingestion of data corresponding to users, executing the instructions based on the data, etc. For example, executing a set of instructions based on ingested data may include executing one or more particular instructions for a user based on the data (e.g., routing the user through the process flow based on data).

At 420, the server 410 may transmit one or more electronic communications to a set of users based on execution of the process flow. The electronic communications may include emails, push notifications, text messages, advertisements, etc.

At 425, a user of the user device 405 browses a platform associated with the tenant. Example platforms associated with the tenants may include websites associated with the tenant, mobile or desktop application associated with the tenants, social media interaction associated with the tenants, etc.

At 430, the server 410 may monitor web behavior data associated with the set of users in accordance with a first action of the set of actions. The web behavior data may be separate from data associated with interaction by the set of users with the electronic communications of the communication process flow. A web service may monitor the web behavior data. In some examples, the web behavior data is associated (e.g., by the web service) with particular users that are in the process flow or candidates for the process flow such that the communication process flow may consider the web behavior data in routing users into and within the communication process flow. The web behavior data may include data such as interaction data with the web platform. The interaction data may correspond to engagement with one or more images on the web platform, scrolling behavior of the one or more users on the web platform, interaction with a product page on the web platform by the one or more users, interaction with one or more pages within a category on the web platform by the one or more users, or a combination thereof.

At 435, the server 410 may detect detecting that a first user of the set of users satisfies a rule defined by the first action based at least in part on monitoring of the web behavior data. The rule may be in the form of a Boolean expression that combines various web behavior parameters using an operator. Thus, if the web behavior associated with the first user satisfies the rule, then the user is routed to a next action (e.g., a communication action) in the communication process flow. In some cases, the first user may not satisfy the rule until performing an action on the platform, after which the user is routed to the next action.

At 440, the server 410 may route the first user to a next action of the set of actions in the communication process flow based at least in part on detecting that the first user satisfies the rule. Routing the user to the next action may include executing the instructions, corresponding to the next action, for the user. For example, if the next action is "send email," then an email is sent to the user. In some cases, the next action is the first communication action in the communication process flow such that each user that satisfies the rule is routed into the communication process flow. Thus, the first action may be an example of an entry source conditional into the communication process flow. In other examples, the first action is a decision split, where some users may be routed into various branches or paths within the communication process flow based on the rule associated with the action. Again, routing the users may be executing the instructions corresponding to the next action that corresponds to the user's satisfaction of the rule.

At 445, the server 410 may transmit, to one or more users of the set of users, an electronic communication comprising a content field in accordance with the communication process flow. At 450, a user may open the electronic communication (e.g., click the email, push notification, advertisement). At 455, the user device 405 may transmit an open indication to the server 410. At 460, the server may receive, from the user of the user device 405, the open indication that indicates that the user has opened the electronic communication. At 465, the server may select from at least one user of the one or more users, an indication that the at least one user has opened the electronic communication based at least in part on the web behavior data, a content item of a plurality of content items associated with a second action of the set of actions. That is, the action may be configured with a set of displayable content items, and the server 410 selects the content item of the set based on the recent web behavior data. At 470, the server 410 may cause the selected content item to be displayed in the content field of the electronic communication based at least in part on the second action of the set of actions. The server 410 may transmit an indication of the content item to the user device 405 (e.g., the client) such that the content item is displayed. At 475, the user device 405 may display the selected content item to the user.

Figure 5:
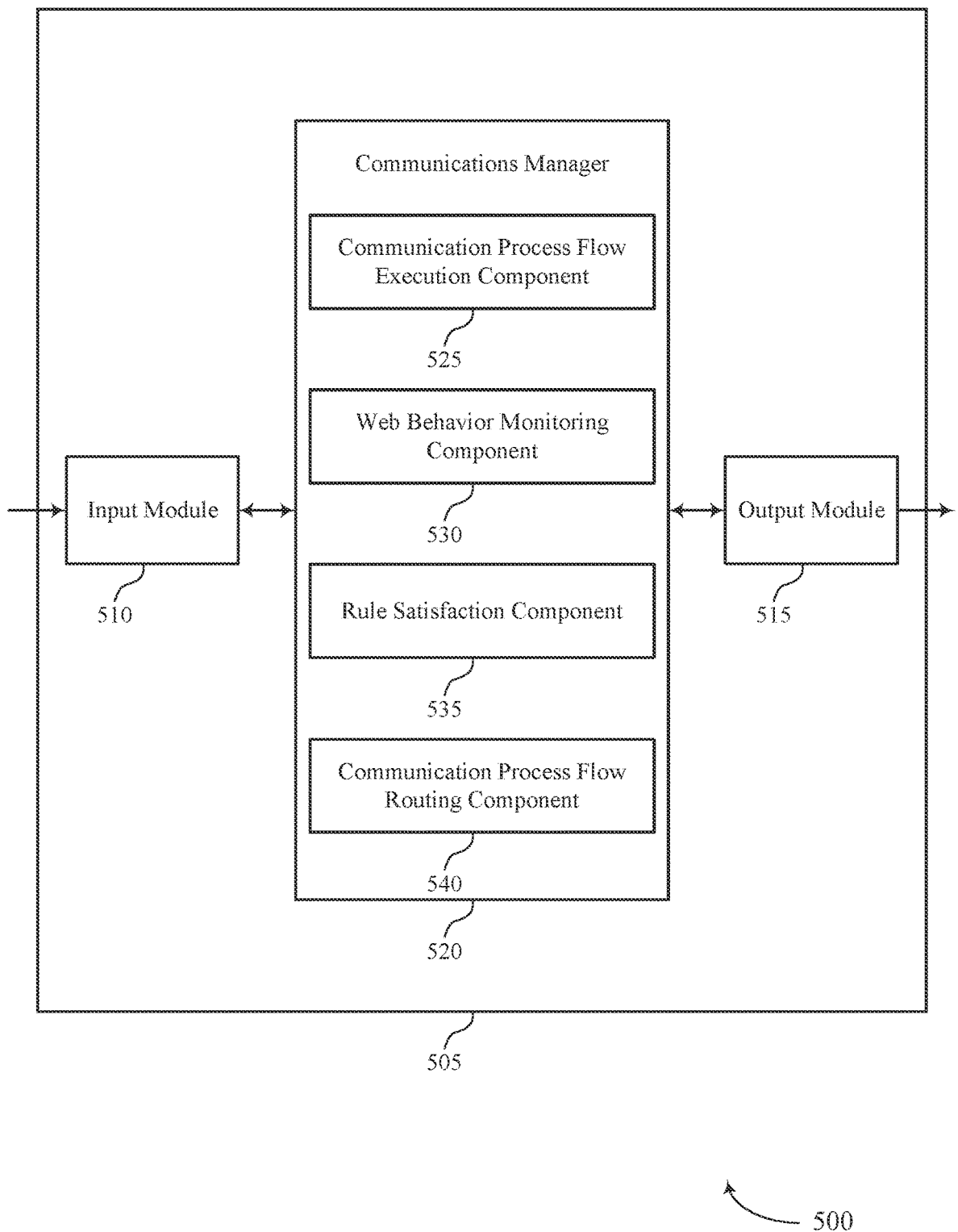
FIG. 5 shows a block diagram of an apparatus that supports communicating based on a workflow using web behavior data in accordance with aspects of the present disclosure.

FIG. 5 shows a block diagram 500 of a device 505 that supports communicating based on a workflow using web behavior data in accordance with aspects of the present disclosure. The device 505 may include an input module 510, an output module 515, and a communications manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 520 to support communicating based on a workflow using web behavior data. In some cases, the input module 510 may be a component of an I/O controller 710 as described with reference to FIG. 7.

The output module 515 may manage output signals for the device 505. For example, the output module 515 may receive signals from other components of the device 505, such as the communications manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the communications manager 520 may include a communication process flow execution component 525, a web behavior monitoring component 530, a rule satisfaction component 535, a communication process flow routing component 540, or any combination thereof. In some examples, the communications manager 520, or various components thereof, may be configured to perform various operations (e.g., receiving, monitoring, transmitting) using or otherwise in cooperation with the input module 510, the output module 515, or both. For example, the communications manager 520 may receive information from the input module 510, send information to the output module 515, or be integrated in combination with the input module 510, the output module 515, or both to receive information, transmit information, or perform various other operations as described herein.

The communications manager 520 may support data processing in accordance with examples as disclosed herein. The communication process flow execution component 525 may be configured as or otherwise support a means for executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The web behavior monitoring component 530 may be configured as or otherwise support a means for monitoring web behavior data associated with the set of users in accordance with a first action of the set of actions, wherein the web behavior data is separate from data associated with interaction by the set of users with the electronic communications of the communication process flow. The rule satisfaction component 535 may be configured as or otherwise support a means for detecting that a first user of the set of users satisfies a rule defined by the first action based at least in part on monitoring of the web behavior data. The communication process flow routing component 540 may be configured as or otherwise support a means for routing the first user to a next action of the set of actions in the communication process flow based at least in part on detecting that the first user satisfies the rule.

Figure 6:
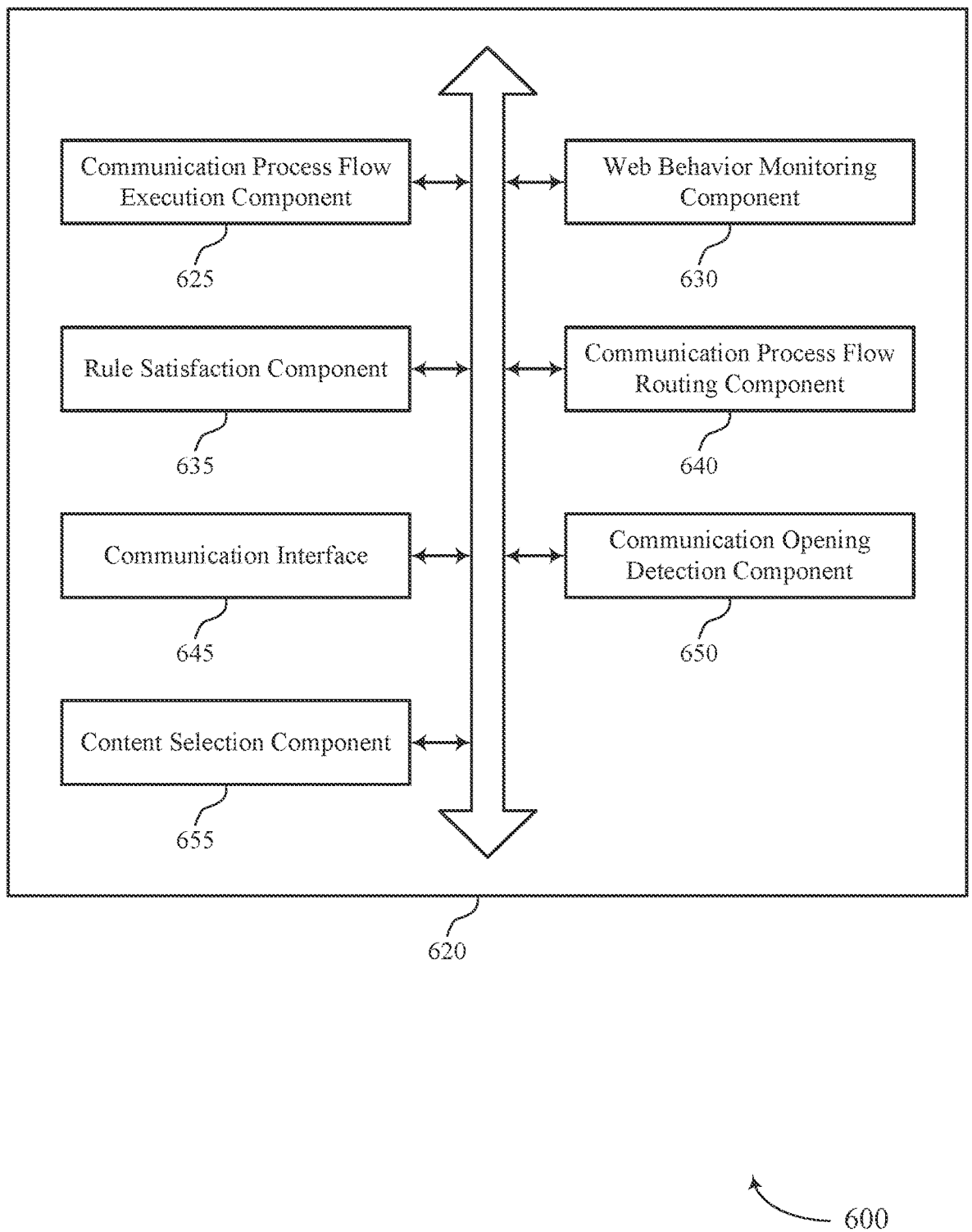
FIG. 6 shows a block diagram of a communications manager that supports communicating based on a workflow using web behavior data in accordance with aspects of the present disclosure.

FIG. 6 shows a block diagram 600 of a communications manager 620 that supports communicating based on a workflow using web behavior data in accordance with aspects of the present disclosure. The communications manager 620 may be an example of aspects of a communications manager or a communications manager 520, or both, as described herein. The communications manager 620, or various components thereof, may be an example of means for performing various aspects of communicating based on a workflow using web behavior data as described herein. For example, the communications manager 620 may include a communication process flow execution component 625, a web behavior monitoring component 630, a rule satisfaction component 635, a communication process flow routing component 640, a communication interface 645, a communication opening detection component 650, a content selection component 655, or any combination thereof. Each of these components may communicate, directly or indirectly, with one another (e.g., via one or more buses).

The communications manager 620 may support data processing in accordance with examples as disclosed herein. The communication process flow execution component 625 may be configured as or otherwise support a means for executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The web behavior monitoring component 630 may be configured as or otherwise support a means for monitoring web behavior data associated with the set of users in accordance with a first action of the set of actions, wherein the web behavior data is separate from data associated with interaction by the set of users with the electronic communications of the communication process flow. The rule satisfaction component 635 may be configured as or otherwise support a means for detecting that a first user of the set of users satisfies a rule defined by the first action based at least in part on monitoring of the web behavior data. The communication process flow routing component 640 may be configured as or otherwise support a means for routing the first user to a next action of the set of actions in the communication process flow based at least in part on detecting that the first user satisfies the rule.

In some examples, the communication process flow routing component 640 may be configured as or otherwise support a means for routing a second user to a third action instead of the second action based at least in part on the web behavior data associated with the second user.

In some examples, to support detecting that the first user of the set of users satisfies the rule, the rule satisfaction component 635 may be configured as or otherwise support a means for detecting that the first user satisfies a Boolean expression that includes a first web behavior, a second web behavior, and an operator.

In some examples, the communication interface 645 may be configured as or otherwise support a means for transmitting, to one or more users of the set of users, an electronic communication comprising a content field in accordance with the communication process flow. In some examples, the communication opening detection component 650 may be configured as or otherwise support a means for receiving, from at least one user of the one or more users, an indication that the at least one user has opened the electronic communication. In some examples, the content selection component 655 may be configured as or otherwise support a means for selecting, based at least in part on the web behavior data, a content item of a plurality of content items associated with a second action of the set of actions. In some examples, the communication interface 645 may be configured as or otherwise support a means for causing the selected content item to be displayed in the content field of the electronic communication based at least in part on the second action of the set of actions.

In some examples, the communication process flow routing component 640 may be configured as or otherwise support a means for routing each user of the set of users that satisfies the rule into the communication process flow in accordance with the first action, based at least in part on the web behavior data associated with the set of user.

In some examples, the rule satisfaction component 635 may be configured as or otherwise support a means for determining that a second user of the set of user fails to satisfy the rule based at least in part on the web behavior data. In some examples, the communication interface 645 may be configured as or otherwise support a means for determining to not transmit an electronic communication to the second user in accordance with the communication process flow based at least in part on determining that the second user fails to satisfy the rule. In some examples, the rule satisfaction component 635 may be configured as or otherwise support a means for determining that updated web behavior data monitored in accordance with the rule triggers satisfaction of the rule by the second user. In some examples, the communication interface 645 may be configured as or otherwise support a means for routing the second user into the communication process flow in accordance with the rule being satisfied based at least in part on the updated web behavior data.

In some examples, to support monitoring the web behavior data, the web behavior monitoring component 630 may be configured as or otherwise support a means for receiving a data stream including data corresponding to interaction, by one or more users of the set of users, with a web platform corresponding to the tenant.

In some examples, the interaction comprises engagement with one or more images on the web platform, scrolling behavior of the one or more users on the web platform, interaction with a product page on the web platform by the one or more users, interaction with one or more pages within a category on the web platform by the one or more users, or a combination thereof.

Figure 7:
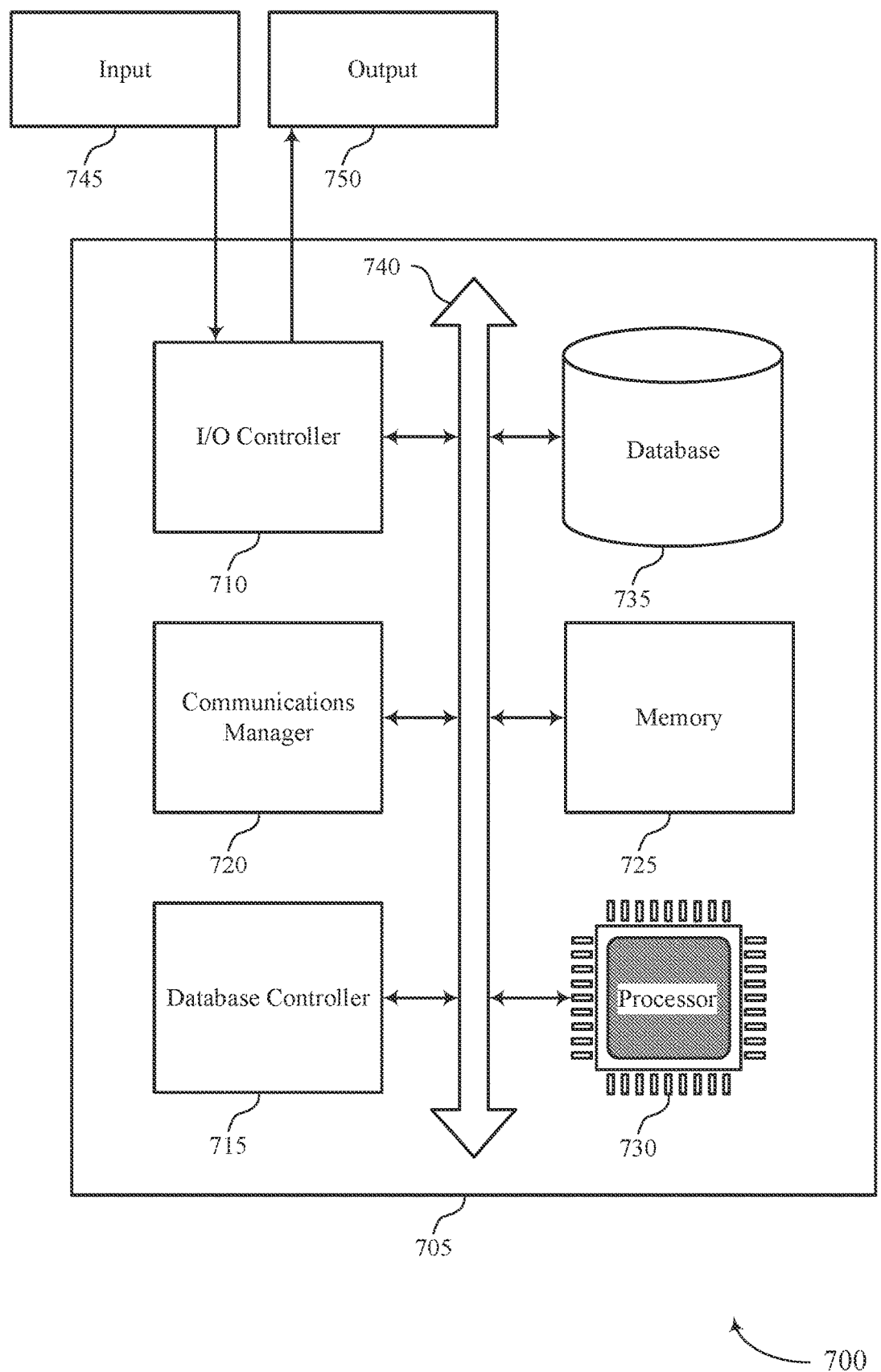
FIG. 7 shows a diagram of a system including a device that supports communicating based on a workflow using web behavior data in accordance with aspects of the present disclosure.

FIG. 7 shows a diagram of a system 700 including a device 705 that supports communicating based on a workflow using web behavior data in accordance with aspects of the present disclosure. The device 705 may be an example of or include the components of a device 505 as described herein. The device 705 may include components for bi-directional data communications including components for transmitting and receiving communications, such as a communications manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting communicating based on a workflow using web behavior data).

The communications manager 720 may support data processing in accordance with examples as disclosed herein. For example, the communications manager 720 may be configured as or otherwise support a means for executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The communications manager 720 may be configured as or otherwise support a means for monitoring web behavior data associated with the set of users in accordance with a first action of the set of actions, wherein the web behavior data is separate from data associated with interaction by the set of users with the electronic communications of the communication process flow. The communications manager 720 may be configured as or otherwise support a means for detecting that a first user of the set of users satisfies a rule defined by the first action based at least in part on monitoring of the web behavior data. The communications manager 720 may be configured as or otherwise support a means for routing the first user to a next action of the set of actions in the communication process flow based at least in part on detecting that the first user satisfies the rule.

Figure 8:
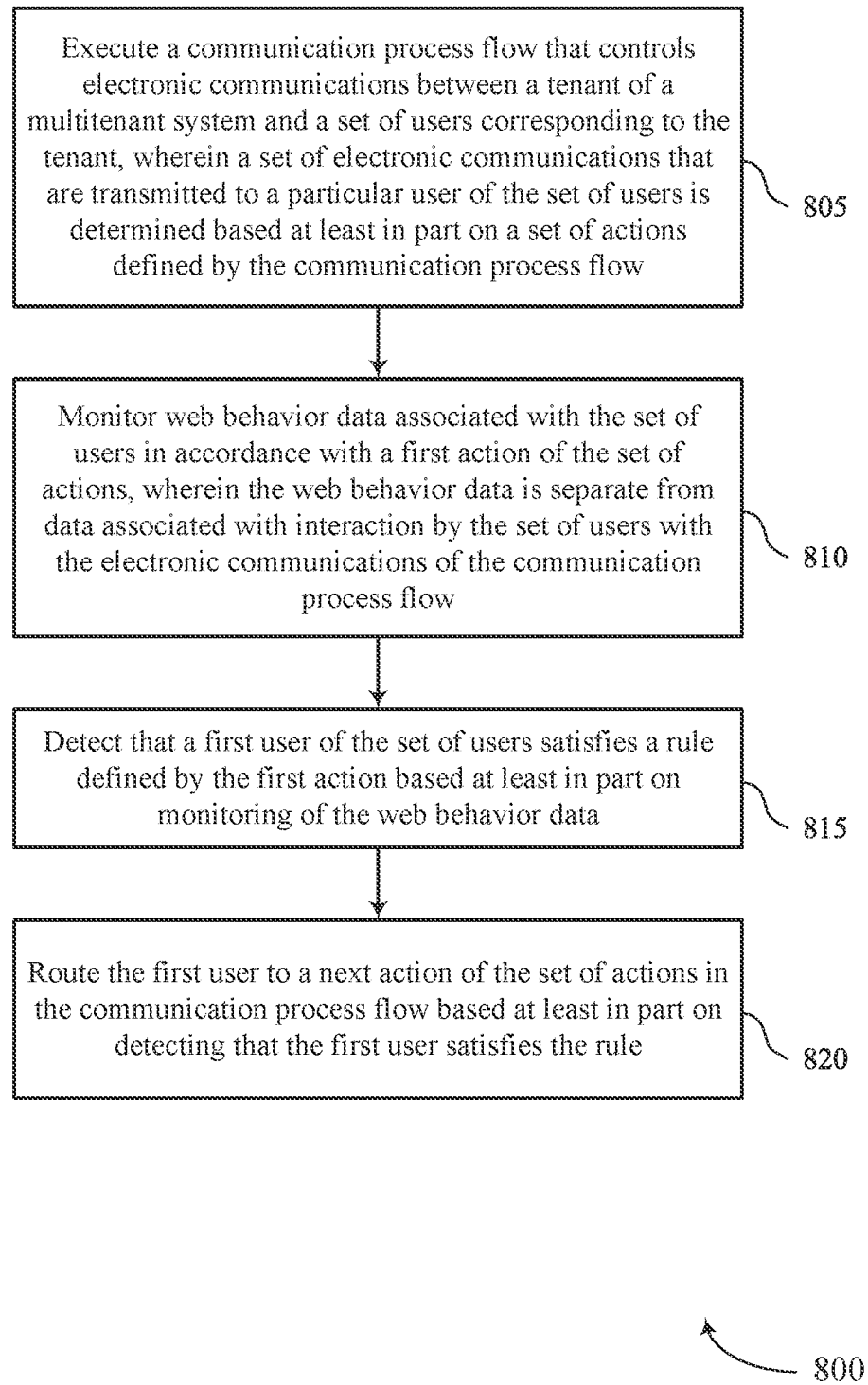
FIGS. 8 through 11 show flowcharts illustrating methods that support communicating based on a workflow using web behavior data in accordance with aspects of the present disclosure.

FIG. 8 shows a flowchart illustrating a method 800 that supports communicating based on a workflow using web behavior data in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 805, the method may include executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The operations of 805 may be performed in accordance with examples as disclosed herein. In some examples, aspects of the operations of 805 may be performed by a communication process flow execution component 625 as described with reference to FIG. 6.

At 810, the method may include monitoring web behavior data associated with the set of users in accordance with a first action of the set of actions, wherein the web behavior data is separate from data associated with interaction by the set of users with the electronic communications of the communication process flow. The operations of 810 may be performed in accordance with examples as disclosed herein. In some examples, aspects of the operations of 810 may be performed by a web behavior monitoring component 630 as described with reference to FIG. 6.

At 815, the method may include detecting that a first user of the set of users satisfies a rule defined by the first action based at least in part on monitoring of the web behavior data. The operations of 815 may be performed in accordance with examples as disclosed herein. In some examples, aspects of the operations of 815 may be performed by a rule satisfaction component 635 as described with reference to FIG. 6.

At 820, the method may include routing the first user to a next action of the set of actions in the communication process flow based at least in part on detecting that the first user satisfies the rule. The operations of 820 may be performed in accordance with examples as disclosed herein. In some examples, aspects of the operations of 820 may be performed by a communication process flow routing component 640 as described with reference to FIG. 6.

Figure 9:
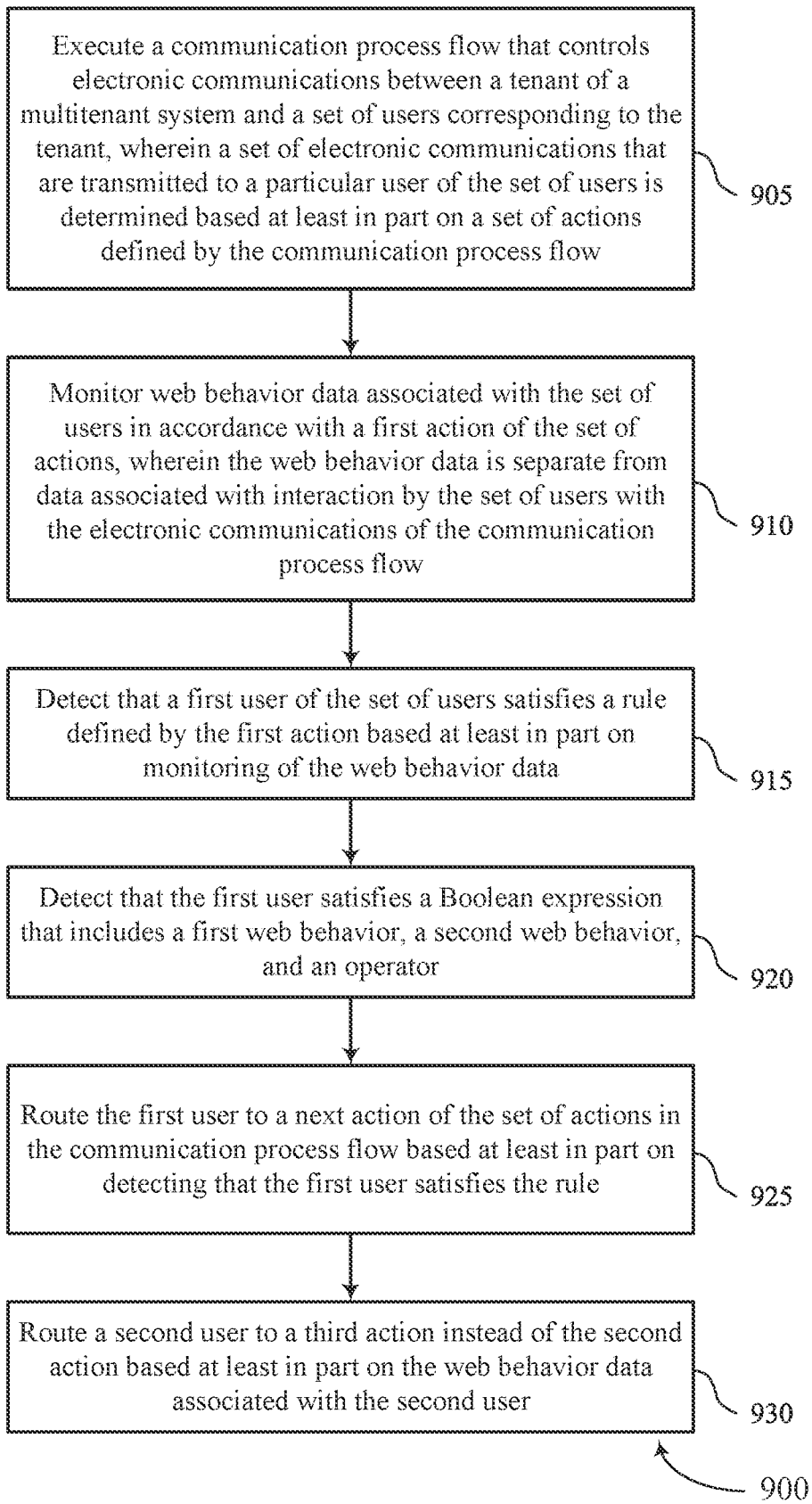

FIG. 9 shows a flowchart illustrating a method 900 that supports communicating based on a workflow using web behavior data in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 905, the method may include executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The operations of 905 may be performed in accordance with examples as disclosed herein. In some examples, aspects of the operations of 905 may be performed by a communication process flow execution component 625 as described with reference to FIG. 6.

At 910, the method may include monitoring web behavior data associated with the set of users in accordance with a first action of the set of actions, wherein the web behavior data is separate from data associated with interaction by the set of users with the electronic communications of the communication process flow. The operations of 910 may be performed in accordance with examples as disclosed herein. In some examples, aspects of the operations of 910 may be performed by a web behavior monitoring component 630 as described with reference to FIG. 6.

At 915, the method may include detecting that a first user of the set of users satisfies a rule defined by the first action based at least in part on monitoring of the web behavior data. The operations of 915 may be performed in accordance with examples as disclosed herein. In some examples, aspects of the operations of 915 may be performed by a rule satisfaction component 635 as described with reference to FIG. 6.

At 920, the method may include detecting that the first user satisfies a Boolean expression that includes a first web behavior, a second web behavior, and an operator. The operations of 920 may be performed in accordance with examples as disclosed herein. In some examples, aspects of the operations of 920 may be performed by a rule satisfaction component 635 as described with reference to FIG. 6.

At 925, the method may include routing the first user to a next action of the set of actions in the communication process flow based at least in part on detecting that the first user satisfies the rule. The operations of 925 may be performed in accordance with examples as disclosed herein. In some examples, aspects of the operations of 925 may be performed by a communication process flow routing component 640 as described with reference to FIG. 6.

At 930, the method may include routing a second user to a third action instead of the second action based at least in part on the web behavior data associated with the second user. The operations of 930 may be performed in accordance with examples as disclosed herein. In some examples, aspects of the operations of 930 may be performed by a communication process flow routing component 640 as described with reference to FIG. 6.

Figure 10:
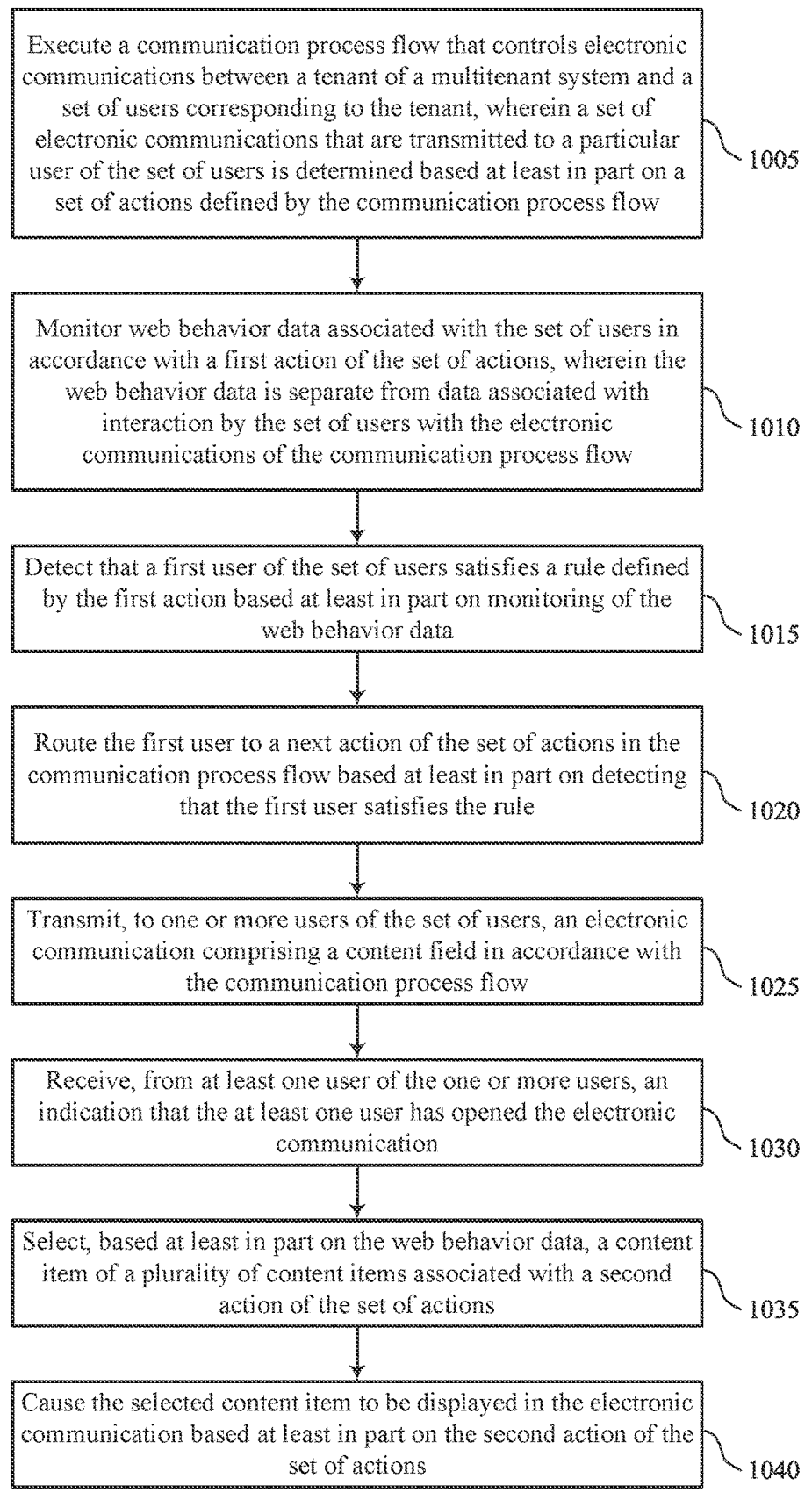

FIG. 10 shows a flowchart illustrating a method 1000 that supports communicating based on a workflow using web behavior data in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1005, the method may include executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The operations of 1005 may be performed in accordance with examples as disclosed herein. In some examples, aspects of the operations of 1005 may be performed by a communication process flow execution component 625 as described with reference to FIG. 6.

At 1010, the method may include monitoring web behavior data associated with the set of users in accordance with a first action of the set of actions, wherein the web behavior data is separate from data associated with interaction by the set of users with the electronic communications of the communication process flow. The operations of 1010 may be performed in accordance with examples as disclosed herein. In some examples, aspects of the operations of 1010 may be performed by a web behavior monitoring component 630 as described with reference to FIG. 6.

At 1015, the method may include detecting that a first user of the set of users satisfies a rule defined by the first action based at least in part on monitoring of the web behavior data. The operations of 1015 may be performed in accordance with examples as disclosed herein. In some examples, aspects of the operations of 1015 may be performed by a rule satisfaction component 635 as described with reference to FIG. 6.

At 1020, the method may include routing the first user to a next action of the set of actions in the communication process flow based at least in part on detecting that the first user satisfies the rule. The operations of 1020 may be performed in accordance with examples as disclosed herein. In some examples, aspects of the operations of 1020 may be performed by a communication process flow routing component 640 as described with reference to FIG. 6.

At 1025, the method may include transmitting, to one or more users of the set of users, an electronic communication comprising a content field in accordance with the communication process flow. The operations of 1025 may be performed in accordance with examples as disclosed herein. In some examples, aspects of the operations of 1025 may be performed by a communication interface 645 as described with reference to FIG. 6.

At 1030, the method may include receiving, from at least one user of the one or more users, an indication that the at least one user has opened the electronic communication. The operations of 1030 may be performed in accordance with examples as disclosed herein. In some examples, aspects of the operations of 1030 may be performed by a communication opening detection component 650 as described with reference to FIG. 6.

At 1035, the method may include selecting, based at least in part on the web behavior data, a content item of a plurality of content items associated with a second action of the set of actions. The operations of 1035 may be performed in accordance with examples as disclosed herein. In some examples, aspects of the operations of 1035 may be performed by a content selection component 655 as described with reference to FIG. 6.

At 1040, the method may include causing the selected content item to be displayed in the content field of the electronic communication based at least in part on the second action of the set of actions. The operations of 1040 may be performed in accordance with examples as disclosed herein. In some examples, aspects of the operations of 1040 may be performed by a communication interface 645 as described with reference to FIG. 6.

Figure 11:
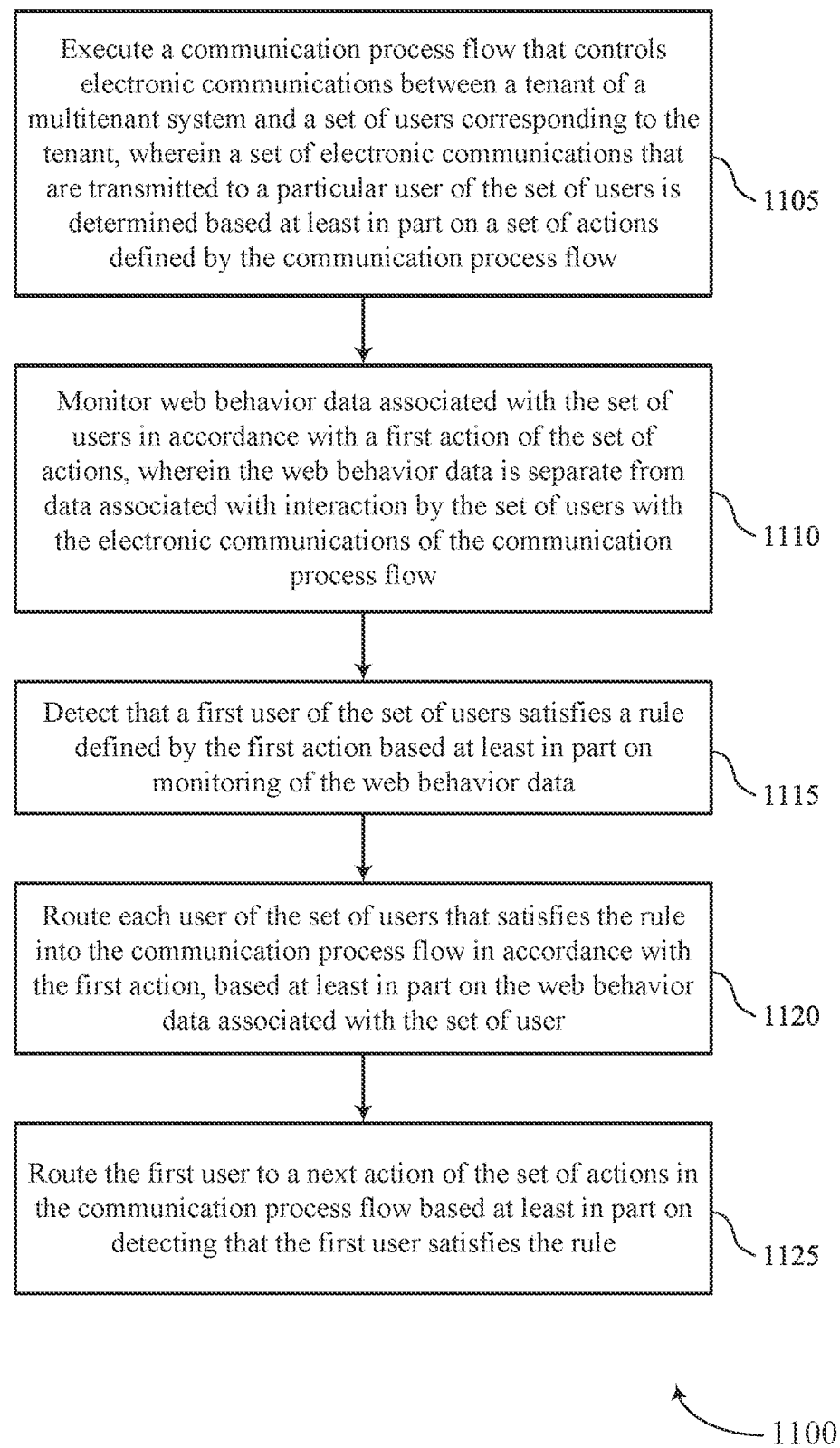

FIG. 11 shows a flowchart illustrating a method 1100 that supports communicating based on a workflow using web behavior data in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1105, the method may include executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow. The operations of 1105 may be performed in accordance with examples as disclosed herein. In some examples, aspects of the operations of 1105 may be performed by a communication process flow execution component 625 as described with reference to FIG. 6.

At 1110, the method may include monitoring web behavior data associated with the set of users in accordance with a first action of the set of actions, wherein the web behavior data is separate from data associated with interaction by the set of users with the electronic communications of the communication process flow. The operations of 1110 may be performed in accordance with examples as disclosed herein. In some examples, aspects of the operations of 1110 may be performed by a web behavior monitoring component 630 as described with reference to FIG. 6.

At 1115, the method may include detecting that a first user of the set of users satisfies a rule defined by the first action based at least in part on monitoring of the web behavior data. The operations of 1115 may be performed in accordance with examples as disclosed herein. In some examples, aspects of the operations of 1115 may be performed by a rule satisfaction component 635 as described with reference to FIG. 6.

At 1120, the method may include routing each user of the set of users that satisfies the rule into the communication process flow in accordance with the first action, based at least in part on the web behavior data associated with the set of user. The operations of 1120 may be performed in accordance with examples as disclosed herein. In some examples, aspects of the operations of 1120 may be performed by a communication process flow routing component 640 as described with reference to FIG. 6.

At 1125, the method may include routing the first user to a next action of the set of actions in the communication process flow based at least in part on detecting that the first user satisfies the rule. The operations of 1125 may be performed in accordance with examples as disclosed herein. In some examples, aspects of the operations of 1125 may be performed by a communication process flow routing component 640 as described with reference to FIG. 6.

A method for data processing is described. The method may include executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow, monitoring web behavior data associated with the set of users in accordance with a first action of the set of actions, wherein the web behavior data is separate from data associated with interaction by the set of users with the electronic communications of the communication process flow, detecting that a first user of the set of users satisfies a rule defined by the first action based at least in part on monitoring of the web behavior data, and routing the first user to a next action of the set of actions in the communication process flow based at least in part on detecting that the first user satisfies the rule.

An apparatus for data processing is described. The apparatus may include a processor, memory coupled with the processor, and instructions stored in the memory. The instructions may be executable by the processor to cause the apparatus to execute a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow, monitor web behavior data associated with the set of users in accordance with a first action of the set of actions, wherein the web behavior data is separate from data associated with interaction by the set of users with the electronic communications of the communication process flow, detect that a first user of the set of users satisfies a rule defined by the first action based at least in part on monitoring of the web behavior data, and route the first user to a next action of the set of actions in the communication process flow based at least in part on detecting that the first user satisfies the rule.

Another apparatus for data processing is described. The apparatus may include means for executing a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow, means for monitoring web behavior data associated with the set of users in accordance with a first action of the set of actions, wherein the web behavior data is separate from data associated with interaction by the set of users with the electronic communications of the communication process flow, means for detecting that a first user of the set of users satisfies a rule defined by the first action based at least in part on monitoring of the web behavior data, and means for routing the first user to a next action of the set of actions in the communication process flow based at least in part on detecting that the first user satisfies the rule.

A non-transitory computer-readable medium storing code for data processing is described. The code may include instructions executable by a processor to execute a communication process flow that controls electronic communications between a tenant of a multitenant system and a set of users corresponding to the tenant, wherein a set of electronic communications that are transmitted to a particular user of the set of users is determined based at least in part on a set of actions defined by the communication process flow, monitor web behavior data associated with the set of users in accordance with a first action of the set of actions, wherein the web behavior data is separate from data associated with interaction by the set of users with the electronic communications of the communication process flow, detect that a first user of the set of users satisfies a rule defined by the first action based at least in part on monitoring of the web behavior data, and route the first user to a next action of the set of actions in the communication process flow based at least in part on detecting that the first user satisfies the rule.

In some examples of the method, apparatuses, and non-transitory computer-readable medium described herein, and the method, apparatuses, and non-transitory computer-readable medium may include further operations, features, means, or instructions for routing a second user to a third action instead of the second action based at least in part on the web behavior data associated with the second user.

In some examples of the method, apparatuses, and non-transitory computer-readable medium described herein, detecting that the first user of the set of users satisfies the rule may include operations, features, means, or instructions for detecting that the first user satisfies a Boolean expression that includes a first web behavior, a second web behavior, and an operator.

Some examples of the method, apparatuses, and non-transitory computer-readable medium described herein may further include operations, features, means, or instructions for transmitting, to one or more users of the set of users, an electronic communication comprising a content field in accordance with the communication process flow, receiving, from at least one user of the one or more users, an indication that the at least one user may have opened the electronic communication, selecting, based at least in part on the web behavior data, a content item of a plurality of content items associated with a second action of the set of actions, and causing the selected content item to be displayed in the content field of the electronic communication based at least in part on the second action of the set of actions.

Some examples of the method, apparatuses, and non-transitory computer-readable medium described herein may further include operations, features, means, or instructions for routing each user of the set of users that satisfies the rule into the communication process flow in accordance with the first action, based at least in part on the web behavior data associated with the set of user.

Some examples of the method, apparatuses, and non-transitory computer-readable medium described herein may further include operations, features, means, or instructions for determining that a second user of the set of user fails to satisfy the rule based at least in part on the web behavior data, determining to not transmit an electronic communication to the second user in accordance with the communication process flow based at least in part on determining that the second user fails to satisfy the rule, determining that updated web behavior data monitored in accordance with the rule triggers satisfaction of the rule by the second user, and routing the second user into the communication process flow in accordance with the rule being satisfied based at least in part on the updated web behavior data.

In some examples of the method, apparatuses, and non-transitory computer-readable medium described herein, monitoring the web behavior data may include operations, features, means, or instructions for receiving a data stream including data corresponding to interaction, by one or more users of the set of users, with a web platform corresponding to the tenant.

In some examples of the method, apparatuses, and non-transitory computer-readable medium described herein, the interaction comprises engagement with one or more images on the web platform, scrolling behavior of the one or more users on the web platform, interaction with a product page on the web platform by the one or more users, interaction with one or more pages within a category on the web platform by the one or more users, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or. or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
reading, by one or more hardware processors, attribute data, ingested from a file;
defining, by the one or more hardware processors, routing paths for a plurality of users based on an inference of the attribute data associated with the plurality of users that engaged with a prior communication;
splitting, by the one or more hardware processors, the plurality of users that engaged with a prior communication, based on the defined routing paths, to reduce consumption of computing resources caused by periodic, batched refreshing of the file, and to mitigate outdated data of the ingested attribute data;
executing, by the one or more hardware processors, a communication process flow that controls electronic communications between a tenant of a multitenant system and a set of users associated with the tenant, wherein a set of electronic communications that are transmitted to a particular user of the set of users is determined based at least in part on a set of actions defined by the routing paths;
monitoring, by the one or more hardware processors, web behavior data associated with the set of users and a web platform associated with the tenant in accordance with a first action of the set of actions defined by the routing paths, wherein the web behavior data at the web platform is separate and different from other data associated with interaction by the set of users with the electronic communications of the communication process flow;

structuring, by the one or more hardware processors, the web behavior data into a JavaScript object notation (JSON) format, to subsequently ingest the attribute data in real-time according to a plurality of arrays and a hierarchy of the structured web behavior data;

detecting, by the one or more hardware processors, based at least in part on the web behavior performed by a first user at the web platform that the first user of the set of users satisfies a Boolean rule corresponding to the structured web behavior data defined by the first action; and routing, by the one or more hardware processors, the first user to a next action of the set of actions in one of the routing paths of the communication process flow based at least in part on the detecting that the first user satisfies the Boolean rule.

2. The method of claim 1, wherein the next action comprises a second action, the method further comprising:
routing a second user to a third action instead of the second action based at least in part on the web behavior data associated with the second user.

3. The method of claim 1, wherein detecting that the first user of the set of users satisfies the Boolean rule further comprises:
detecting that the first user satisfies a Boolean expression that includes a first web behavior, a second web behavior, and an operator.

4. The method of claim 1, further comprising:
transmitting, to one or more users of the set of users, an electronic communication comprising a content field in accordance with the communication process flow;
receiving, from at least one user of the one or more users, an indication that the at least one user has opened the electronic communication;
selecting, based at least in part on the web behavior data, a content item of a plurality of content items associated with a second action of the set of actions; and
causing the selected content item to be displayed in the content field of the electronic communication based at least in part on the second action of the set of actions.

5. The method of claim 1, wherein the first action defines an entry source into the communication process flow, the method further comprising:
routing each user of the set of users that satisfies the Boolean rule into the communication process flow in accordance with the first action, based at least in part on the web behavior data associated with the set of users.

6. The method of claim 5, further comprising:
determining that a second user of the set of users fails to satisfy the Boolean rule based at least in part on the web behavior data;
determining to not transmit an electronic communication to the second user in accordance with the communication process flow based at least in part on determining that the second user fails to satisfy the Boolean rule;
determining that updated web behavior data monitored in accordance with the Boolean rule triggers satisfaction of the Boolean rule by the second user; and routing the second user into the communication process flow in accordance with the Boolean rule being satisfied based at least in part on the updated web behavior data.

7. The method of claim 1, wherein monitoring the web behavior data comprises:
receiving a data stream including data corresponding to a specific interaction, by one or more users of the set of users, with the web platform corresponding to the tenant.

8. The method of claim 7, wherein the specific interaction comprises engagement with one or more images on the web platform, scrolling behavior of the one or more users on the web platform, interaction with a product page on the web platform by the one or more users, interaction with one or more pages within a category on the web platform by the one or more users, or a combination thereof.

9. An apparatus for data processing, comprising:
a hardware processor;
memory coupled with the hardware processor; and
instructions stored in the memory and executable by the hardware processor to cause the apparatus to:
read attribute data, ingested from a file;
define routing paths for a plurality of users based on an inference of the attribute data associated with the plurality of users that engaged with a prior communication;
split the plurality of users that engaged with a prior communication, based on the defined routing paths, to reduce consumption of computing resources caused by periodic, batched refreshing of the file, and to mitigate outdated data of the ingested attribute data;
execute a communication process flow that controls electronic communications between a tenant of a multi-tenant system and a set of users associated with the tenant, wherein a set of electronic communications that are transmitted to a particular user of the set of users is determined based at least in part on a set of actions defined by the routing paths;
monitor, web behavior data associated with the set of users and a web platform associated with the tenant in accordance with a first action of the set of actions defined by the routing paths, wherein the web behavior data at the web platform is separate and different from other data associated with interaction by the set of users with the electronic communications of the communication process flow;
structure the web behavior data into a JavaScript object notation (JSON) format, to subsequently ingest the attribute data in real-time according to a plurality of arrays and a hierarchy of the structured web behavior data;
detect, based at least in part on the web behavior performed by a first user at the web platform, that the first user of the set of users satisfies a Boolean rule corresponding to the structured web behavior data defined by the first action; and
route the first user to a next action of the set of actions in one of the routing paths of the communication process flow based at least in part on the detecting that the first user satisfies the Boolean rule.

10. The apparatus of claim 9, wherein the next action is a second action and the instructions are further executable by the hardware processor to cause the apparatus to:
route a second user to a third action instead of the second action based at least in part on the web behavior data associated with the second user.

11. The apparatus of claim 9, wherein the instructions to detect that the first user of the set of users satisfies the Boolean rule are further executable by the hardware processor to cause the apparatus to:
  detect that the first user satisfies a Boolean expression that includes a first web behavior, a second web behavior, and an operator.

12. The apparatus of claim 9, wherein the instructions are further executable by the hardware processor to cause the apparatus to:
  transmit, to one or more users of the set of users, an electronic communication comprising a content field in accordance with the communication process flow;
  receive, from at least one user of the one or more users, an indication that the at least one user has opened the electronic communication;
  select, based at least in part on the web behavior data, a content item of a plurality of content items associated with a second action of the set of actions; and
  cause the selected content item to be displayed in the content field of the electronic communication based at least in part on the second action of the set of actions.

13. The apparatus of claim 9, wherein the instructions are further executable by the hardware processor to cause the apparatus to:
  route each user of the set of users that satisfies the Boolean rule into the communication process flow in accordance with the first action, based at least in part on the web behavior data associated with the set of users.

14. The apparatus of claim 13, wherein the instructions are further executable by the hardware processor to cause the apparatus to:
  determine that a second user of the set of users fails to satisfy the Boolean rule based at least in part on the web behavior data;
  determine to not transmit an electronic communication to the second user in accordance with the communication process flow based at least in part on determining that the second user fails to satisfy the Boolean rule;
  determine that updated web behavior data monitored in accordance with the Boolean rule triggers satisfaction of the Boolean rule by the second user; and
  route the second user into the communication process flow in accordance with the Boolean rule being satisfied based at least in part on the updated web behavior data.

15. A non-transitory computer-readable medium storing code for data processing, the code comprising instructions executable by a hardware processor to:
  read attribute data, ingested from a file;
  define routing paths for a plurality of users based on an inference of the attribute data associated with the plurality of users that engaged with a prior communication;
  split the plurality of users that engaged with a prior communication, based on the defined routing paths, to reduce consumption of computing resources caused by periodic, batched refreshing of the file, and to mitigate outdated data of the ingested attribute data;
  execute a communication process flow that controls electronic communications between a tenant of a multi-tenant system and a set of users associated with the tenant, wherein a set of electronic communications that are transmitted to a particular user of the set of users is determined based at least in part on a set of actions defined by the routing paths;
  monitor web behavior data associated with the set of users and a web platform associated with the tenant in accordance with a first action of the set of actions defined by the routing paths, wherein the web behavior data at the web platform is separate and different from other data associated with interaction by the set of users with the electronic communications of the communication process flow;
  detect, based at least in part on the web behavior performed by a first user at the web platform that the first user of the set of users satisfies a Boolean rule corresponding to the structured web behavior data defined by the first action; and
  route the first user to a next action of the set of actions in one of the routing paths of the communication process flow based at least in part on the detecting that the first user satisfies the Boolean rule.

16. The non-transitory computer-readable medium of claim 15, wherein the next action is a second action and the instructions are further executable by the hardware processor to:
  route a second user to a third action instead of the second action based at least in part on the web behavior data associated with the second user.

17. The non-transitory computer-readable medium of claim 15, wherein the instructions to detect that the first user of the set of users satisfies the Boolean rule are further executable by the hardware processor to:
  detect that the first user satisfies a Boolean expression that includes a first web behavior, a second web behavior, and an operator.

18. The non-transitory computer-readable medium of claim 15, wherein the instructions are further executable by the hardware processor to:
  transmit, to one or more users of the set of users, an electronic communication comprising a content field in accordance with the communication process flow;
  receive, from at least one user of the one or more users, an indication that the at least one user has opened the electronic communication;
  select, based at least in part on the web behavior data, a content item of a plurality of content items associated with a second action of the set of actions; and
  cause the selected content item to be displayed in the content field of the electronic communication based at least in part on the second action of the set of actions.

19. The non-transitory computer-readable medium of claim 15, wherein the instructions are further executable by the hardware processor to:
  route each user of the set of users that satisfies the Boolean rule into the communication process flow in accordance with the first action, based at least in part on the web behavior data associated with the set of users.

20. The non-transitory computer-readable medium of claim 19, wherein the instructions are further executable by the hardware processor to:
  determine that a second user of the set of users fails to satisfy the Boolean rule based at least in part on the web behavior data;
  determine to not transmit an electronic communication to the second user in accordance with the communication process flow based at least in part on determining that the second user fails to satisfy the Boolean rule;
  determine that updated web behavior data monitored in accordance with the Boolean rule triggers satisfaction of the Boolean rule by the second user; and route the second user into the communication process flow in accordance with the Boolean rule being satisfied based at least in part on the updated web behavior data.

* * * * *